Patented Nov. 10, 1936                                                         2,060,163

UNITED STATES PATENT OFFICE 2,060,163

AZO DYESTUFFS

Gérald Bonhôte, Basel, Switzerland, assignor to Society of Chemical Industry in Basle, Basel, Switzerland No Drawing. Application July 7, 1936, Serial No. 89,464. In Switzerland July 12, 1935

8 Claims. (Cl. 260—95)

The present invention relates to new azo-dyestuffs.

It has been found that the ortho-aminodiphenylethers of the general formula

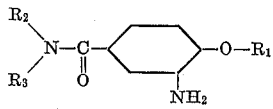

wherein $R_1$ stands for an aryl nucleus of the benzene series, $R_2$ stands for a member of the group consisting of alkyl and aralkyl radicals, and $R_3$ stands for a member of the group consisting of alkyl, aralkyl and aryl radicals, are very suitable for the manufacture of azo-dyestuffs. When diazotized and coupled with the arylides obtained by condensing 2,3-hydroxynaphthoic acid with primary aromatic mono- and di-amines of the benzene, naphthalene and diphenyl series, they yield dyestuffs which are characterized by their vividness and excellent fastness properties.

The new dyestuffs correspond to the general formula

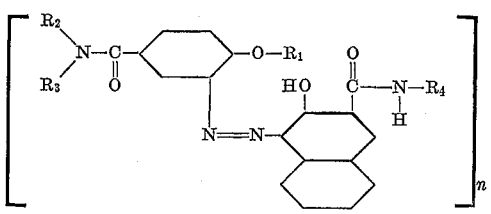

wherein $R_1$, $R_2$ and $R_3$ have the meaning indicated above, $R_4$ stands for a radical selected from the group of the aromatic nuclei of the benzene, naphthalene and diphenyl series, and $n$ stands for a whole number smaller than 3. They are red powders insoluble in water, but soluble in pyridine to orange to red-orange solutions and in sulfuric acid to violet solutions. When produced on the fiber or other substrata, they dye the same scarlet, red and blue-red tints which are characterized by their brightness and other valuable properties.

Among the dyestuffs of the present invention those are particularly valuable which correspond to the above mentioned general formula, wherein $n$ stands for 1. Among these dyestuffs those are of particular interest again, wherein $R_4$ stands for a radical of the benzene series, and $R_2$ and $R_3$ stand for the same or different alkyl radicals. In the latter group special mention must be made of the dyestuffs deriving from such arylides which have themselves been obtained by condensing the 2,3-hydroxynaphthoic acid with aromatic amines of the benzene series which correspond to the general formula

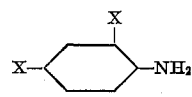

wherein at least one of the two X's stands for an alkoxy group, and the other X stands for a member of the group consisting of hydrogen and alkoxy. Such bases are, for example, ortho- and para-anisidine, ortho- and para-phenetidine, dimethyl- and diethyl-ether of 1-amino-2,4- or 2,5-dihydroxy benzene, methyl- or ethyl-ether of 1-amino-2-methyl-4- or 5-hydroxy benzene, 1-amino-2,4-dimethoxy-5-chlorobenzene, 1-amino-2,5-dimethoxy-4-chlorobenzene and the like. Such dyestuffs correspond to the general formula

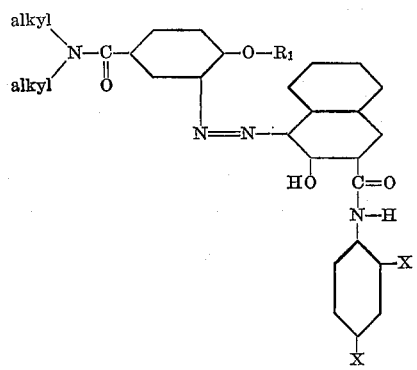

wherein $R_1$ stands for an aromatic radical of the benzene series, one X stands for O-alkyl, and the other X stands for a member of the group consisting of hydrogen and O-alkyl, and wherein all alkyl radicals contain at the most 2 carbon atoms.

The following examples illustrate the invention, the parts being by weight:—

Example 1

31.8 parts of the diethylamide of the 2-amino-4'-chloro-1,1'-diphenylether - 4 - carboxylic acid are diazotized in the usual manner and introduced into a solution of 26.3 parts of 2,3-hydroxynaphthoic acid anilide, 50 parts of sodium hydroxide solution of 30 per cent. strength, 15 parts of sodium carbonate and 2000 parts of water. The dyestuff thus formed of the formula

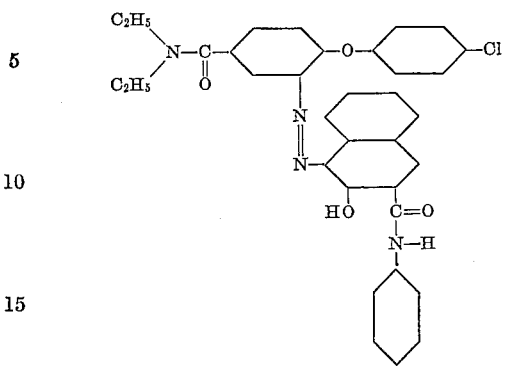

precipitates at once. The orange-red precipitate is filtered and dried.

*Example 2*

Cotton yarn is impregnated with a solution containing per liter 7 grams of 2,3-hydroxynaphthoic acid-ortho-anisidide, 9 cc. of sodium hydroxide solution of 34° Bé., 10 cc. of Turkey red oil, 7 cc. of formaldehyde solution of 40 per cent. strength, thoroughly wrung out and developed in a diazo solution neutralized with sodium acetate and containing per liter 2 grams of the diethylamide of the 2-amino-4'-chloro-1,1'-diphenylether-4-carboxylic acid. The yarn is dyed a pure scarlet-red tint having excellent fastness properties.

The new dyestuff corresponds to the formula

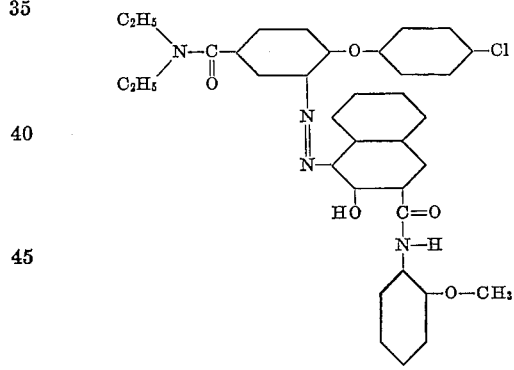

A quite similar dyestuff is obtained with the same diazotizing components and the para-anisidide of 2,3-hydroxynaphthoic acid. The two dyestuffs are soluble in pyridine to an orange solution and in sulfuric acid to a violet solution.

Further dyestuffs according to the present invention are obtained, for example, by coupling the diazotized diazotizing components indicated under A below with the arylides of 2,3-hydroxynaphthoic acid indicated under B below:—

*A*

Diethylamide of 2-amino-1,1'-diphenylether-4-carboxylic acid;
Dimethylamide of 2-amino-1,1'-diphenylether-4-carboxylic acid;
Diethylamide of 2 - amino - 4' - methyl-1,1'-diphenylether-4-carboxylic acid;
Diethylamide of 2 - amino - 2' - methyl-1,1'-diphenylether-4-carboxylic acid;
Dimethylamide of 2-amino-2'-methyl-1,1'-diphenylether-4-carboxylic acid;
Diethylamide of 2-amino-2'-chloro-1,1'-diphenylether-4-carboxylic acid;
Dimethylamide of 2 - amino - 4'-chloro-1,1'-diphenylether-4-carboxylic acid;
Ethylanilide of 2-amino-4'-chloro-1,1'-diphenylether-4-carboxylic acid;
Benzylanilide of 2-amino-4'-chloro-1,1'-diphenylether-4-carboxylic acid;
Methylanilide of 2-amino-4'-chloro-1,1'-diphenylether-4-carboxylic acid.

*B*

Arylides from:
2,3-hydroxynaphthoic acid (1 mol.) and ortho-toluidine (1 mol.);
2,3-hydroxynaphthoic acid (1 mol.) and para-toluidine (1 mol.);
2,3-hydroxynaphthoic acid (1 mol.) and ortho-phenetidine (1 mol.);
2,3-hydroxynaphthoic acid (1 mol.) and para-phenetidine (1 mol.);
2,3-hydroxynaphthoic acid (1 mol.) and 4-aminodiphenyl (1 mol.);
2,3-hydroxynaphthoic acid (1 mol.) and aminohydroquinone-dimethylether (1 mol.);
2,3-hydroxynaphthoic acid (1 mol.) and aminohydroquinone-diethylether (1 mol.);
2,3-hydroxynaphthoic acid (1 mol.) and 1-amino-2,4-dimethoxybenzene (1 mol.);
2,3-hydroxynaphthoic acid (1 mol.) and 1-amino-2,4-dimethoxy-5-chlorobenzene (1 mol.);
2,3-hydroxynaphthoic acid (1 mol.) and 1-amino-2-methyl-4-methoxybenzene (1 mol.);
2,3-hydroxynaphthoic acid (1 mol.) and 1-amino-2,5-dimethoxy-4-chlorobenzene (1 mol.);
2,3-hydroxynaphthoic acid (1 mol.) and 1-amino-4-chlorobenzene (1 mol.);
2,3-hydroxynaphthoic acid (1 mol.) and 1-aminonaphthalene (1 mol.);
2,3-hydroxynaphthoic acid (1 mol.) and 2-aminonaphthalene (1 mol.);
2,3-hydroxynaphthoic acid (2 mols) and benzidine (1 mol.);
2,3-hydroxynaphthoic acid (2 mols) and ortho-tolidine (1 mol.).

Such dyestuffs are for example the dyestuffs having the following formulæ:—

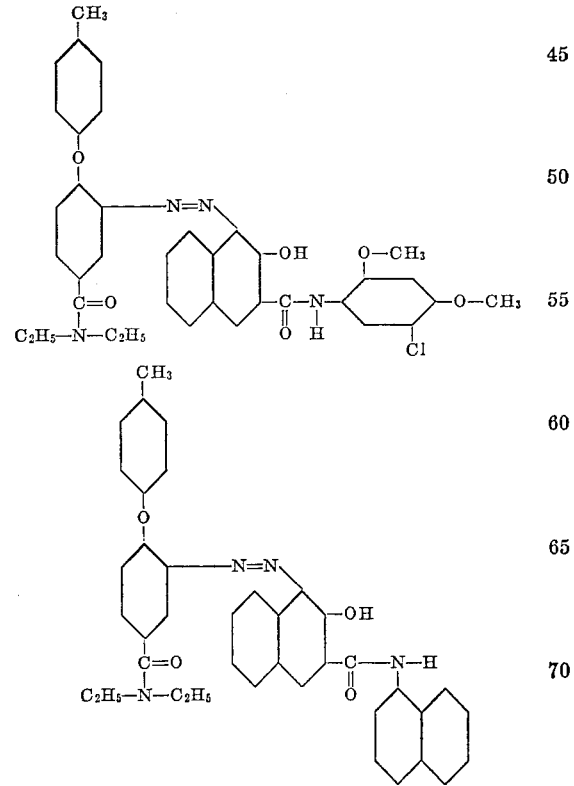

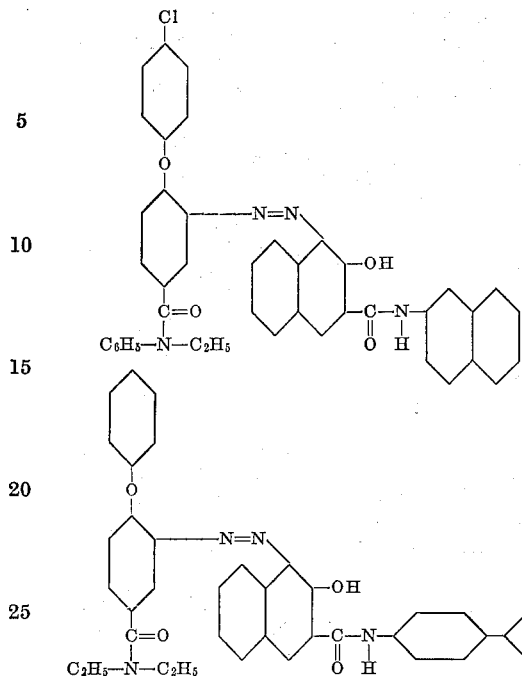

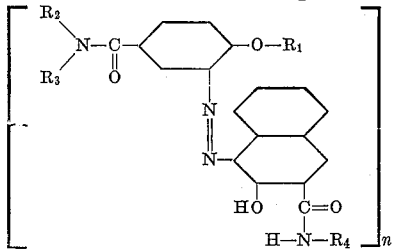

Similar tints are also obtained in printing.

The new dyestuffs may also be used for dyeing various artificial masses, such as esters and ethers of cellulose, plastic masses, such as artificial resins from formaldehyde and phenols, formaldehyde and amines, and formaldehyde and urea, and the like, further also for dyeing caoutchouc. In the latter case the dyestuffs may be incorporated into the mass during the various stages of their manufacture, for example, prior to the vulcanization.

What I claim is:—

1. The new azo-dyestuffs of the general formula

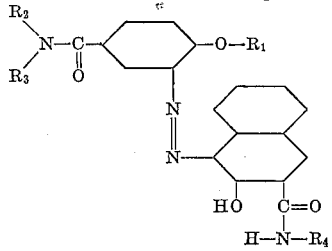

wherein $R_1$ stands for an aryl nucleus of the benzene series, $R_2$ stands for a member of the group consisting of alkyl and aralkyl radicals, $R_3$ stands for a member of the group consisting of alkyl, aralkyl and aryl radicals, $R_4$ stands for an aromatic radical selected from the group of the aromatic nuclei of the benzene, naphthalene and diphenyl series, and $n$ stands for a whole number smaller than 3, which dyestuffs are dark red powders insoluble in water, but soluble in pyridine to orange to red-orange solutions, and in sulfuric acid to yellow solutions, and which dyestuffs, when produced on the fiber, dye the same vidid orange to red and blue-red tints of good fastness properties.

2. The new azo-dyestuffs of the general formula wherein $R_1$ stands for an aryl nucleus of the benzene series, $R_2$ stands for a member of the group consisting of alkyl and aralkyl radicals, $R_3$ stands for a member of the group consisting of alkyl, aralkyl and aryl radicals, and $R_4$ stands for an aromatic radical selected from the group of the aromatc nuclei of the benzene series, which dyestuffs are dark red powders insoluble in water, but soluble in pyridine to orange to red-orange solutions, and in sulfuric acid to yellow solutions, and which dyestuffs, when produced on the fiber, dye the same vivid orange to red and blue-red tints of good fastness properties.

3. The new azo-dyestuffs of the general formula

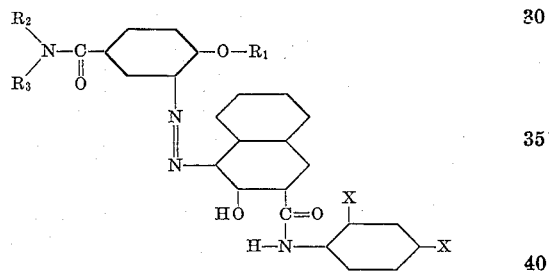

wherein $R_1$ stands for an aryl nucleus of the benzene series, $R_2$ and $R_3$ stand for alkyl groups, wherein further at least one of the two X's stands for an alkoxy group, and the other X stands for a member of the group consisting of hydrogen and alkoxy, which dyestuffs are dark red powders insoluble in water, but soluble in pyridine to orange to red-orange solutions, and in sulfuric acid to yellow solutions, and which dyestuffs, when produced on the fiber, dye the same vivid orange to red and blue-red tints of good fastness properties.

4. The new azo-dyestuffs of the general formula

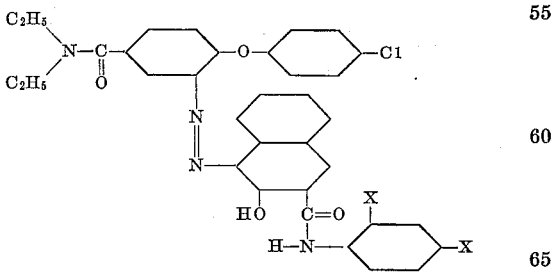

wherein at least one of the two X's stands for an alkoxy group, and the other X stands for a member of the group consisting of hydrogen and alkoxy, which dyestuffs are dark red powders insoluble in water, but soluble in pyridine to orange to red-orange solutions, and in sulfuric acid to yellow solutions, and which dyestuffs, when produced on the fiber, dye the same vivid orange to red and blue-red tints of good fastness properties.

5. The new azo-dyestuffs of the general formula

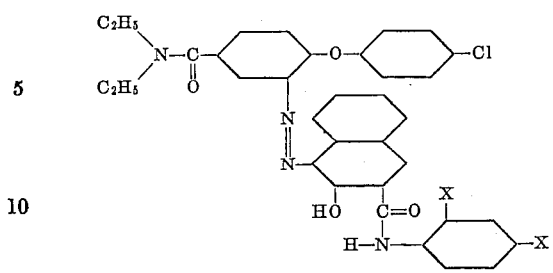

wherein one of the two X's stands for a methoxy group, and the other X stands for a member of the group consisting of hydrogen and methoxy, which dyestuffs are dark red powders insoluble in water, but soluble in pyridine to orange to red-orange solutions, and in sulfuric acid to yellow solutions, and which dyestuffs, when produced on the fiber, dye the same vivid scarlet tints of good fastness properties.

6. The new azo-dyestuffs of the general formula

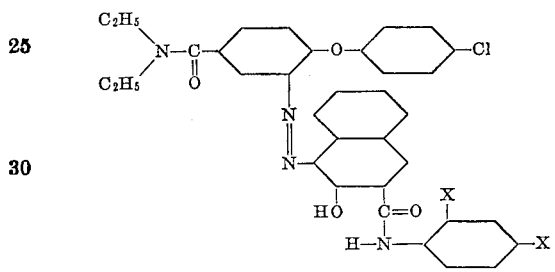

wherein one of the two X's stands for methoxy, and the other X stands for hydrogen, which dyestuffs are dark red powders insoluble in water, but soluble in pyridine to orange to red-orange solutions, and in sulfuric acid to yellow solutions, and which dyestuffs, when produced on the fiber, dye the same vivid scarlet tints of good fastness properties.

7. The new azo-dyestuff of the formula

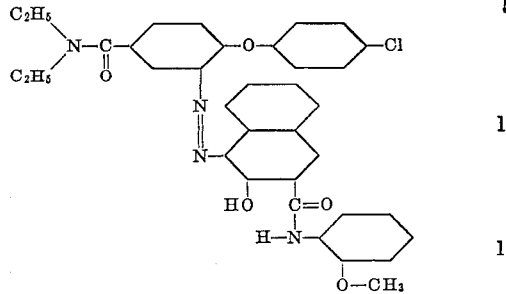

which dyestuff is a red powder soluble in sulfuric acid to a violet solution and in pyridine to an orange solution, and, when produced on the fiber, dyes the same fast orange tints.

8. The new azo-dyestuff of the formula

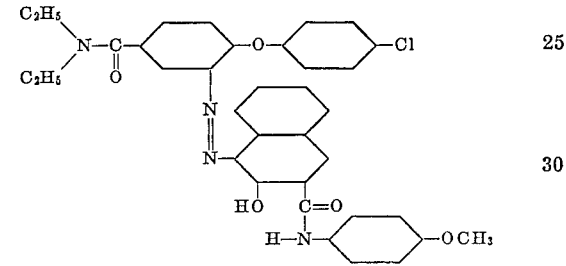

which dyestuff is a red powder soluble in sulfuric acid to a violet solution and in pyridine to an orange solution, and, when produced on the fiber, dyes the same fast orange tints.

GÉRALD BONHÔTE.